United States Patent [19]
Lee et al.

[11] Patent Number: 5,772,826
[45] Date of Patent: Jun. 30, 1998

[54] METHOD FOR PRODUCING HONEYCOMB CORE BY THE ADDITION OF GRAPHITE POWDER

[75] Inventors: Jae-Rock Lee, Yuseong-ku; Soo-Jin Park, Seocho-ku; Mi-Jeong Han, Yuseoung-ku, all of Rep. of Korea

[73] Assignee: Korea Research Institute of Chemical Technology, Daejeon, Rep. of Korea

[21] Appl. No.: 703,030

[22] Filed: Aug. 26, 1996

[30] Foreign Application Priority Data

Aug. 30, 1995 [KR] Rep. of Korea .................. 1995-28681

[51] Int. Cl.$^6$ .............................. B32B 3/12; B32B 31/16; B32B 31/24; B32B 31/26
[52] U.S. Cl. ........................ 156/197; 156/280; 156/291; 428/116
[58] Field of Search ........................... 428/116–118, 188; 156/197, 290, 278–280, 291, 292, 307.1

[56] References Cited

U.S. PATENT DOCUMENTS 5,288,537  2/1994  Corden ................................ 428/118 X

*Primary Examiner*—Adrienne C. Johnstone
*Attorney, Agent, or Firm*—Ladas & Parry

[57] ABSTRACT

The present invention provides a method for producing a honeycomb core having excellent thermal stability, mechanical properties and a rapid setting speed, which comprises applying adhesives onto ribbon type of carbon fiber fabrics at regular intervals so as to form the specific size of a cell, attaching the ribbons in a layered form and heat setting and expanding the attached portion to form a basic honeycomb core and then impregnating and setting the basic honeycomb core in phenol resin containing 0.5 to 4% by weight of graphite powder having 0.3 to 2 $\mu$m of average diameter. This method is characterized by the fact that fiber breakage due to thermal decomposition gas occurring in the setting treatment is prevented and the dispersing effect of surface of graphite is maximized, and thereby the thermal and mechanical properties of the honeycomb core can be optimized.

3 Claims, 3 Drawing Sheets

METHOD FOR PRODUCING HONEYCOMB CORE BY THE ADDITION OF GRAPHITE POWDER

FIELD OF THE INVENTION

The present invention relates to a method for producing a honeycomb core. More particularly, it relates to a method for producing a honeycomb core having excellent thermal stability, mechanical properties and a rapid setting speed by impregnating and setting the basic honeycomb core prepared from a ribbon type of carbon fiber fabric, in phenol resin containing graphite powder.

BACKGROUND OF THE INVENTION

Generally, honeycomb sandwich structural materials are well known as high performance light composite materials. They have excellent mechanical strength against weight, comparable to that of metal, so that they can be used as structural materials for aerospace and for attaining high speed of transportational vehicles or vessels, and as composite materials for construction and civil engineering. Accordingly, it is anticipated that the use of honeycomb cores will be sharply increased.

The main applicable field of honeycomb cores is sandwich structural material, which consists of thin face sheets on both sides having high strength and a thick and light core in between such sheets with an adhesive layer to attach both those face sheets to the core. Both face sheets and core are relatively flexible and weak, but they form a sandwich structure, both face sheets come to fix both surfaces of honeycomb core; therefore, the sandwich structure exhibits very high compressive strength.

Honeycomb cores can be produced by using various materials and have been used widely since 1950. Examples of honeycomb cores are the aluminum honeycomb core having various cell sizes and densities, which are most commonly used; the NOMEX honeycomb core made by using aramid pulp manufactured by the Du Pont Company in the U.S.A.; the kraft honeycomb core made from cost effective kraft paper, which are used as a structural material for construction; glass fiber reinforced plastic honeycomb cores having relatively good thermal stability and low heat conductivity, and thus used in the field requiring electric properties, such as antennas; and the carbon fabric honeycomb core having the most excellent mechanical properties among the non-metallic honeycomb cores.

The methods for producing honeycomb core include expansion and corrugation method.

When metallic materials are used as the core, the expansion method comprises applying adhesives onto metallic materials, layering the metallic materials, heat setting the attached portion under suitable pressure by using a hot press and then subjecting it to expansion treatment using an expander, by which a honeycomb core having the desired cell structure can be obtained. When non-metallic materials are used as the core, the expansion method comprises expanding non-metallic materials so as to form the desired cell shape, impregnating and setting the expanded non-metallic materials in liquid resin, and then repeating the impregnating and setting procedures until the desired density and mechanical properties are attained.

The corrugation method comprises folding metallic or non metallic materials in paper form, in order to have the desired cell shape, applying adhesive onto the node of the folded materials, layering the adhesive treated materials in turn and setting the adhesive to obtain a honeycomb core. This method can be useful in cases where the paper form is relatively thick and a high temperature is required in the production of core or high density core is required, but is inferior to the expansion method in productivity.

The present inventors have made extensive studies in order to find a method for producing a honeycomb core having excellent thermal and mechanical properties. As a result, the present inventors have found that by adding graphite powder having a small diameter and excellent dispersing effect at surfaces to the basic honeycomb core prepared form ribbon type of carbon fiber fabric having the most excellent thermal and mechanical properties among the above-mentioned non-metallic core materials, the final thermal and mechanical properties of the honeycomb core can be greatly improved. Based on this finding, we have completed the present invention.

SUMMARY OF THE INVENTION

It is an object of the present invention to provide a method for producing honeycomb cores having excellent thermal stability, mechanical properties and a rapid setting speed, which comprises applying adhesive onto a ribbon type of carbon fiber fabrics at regular intervals, so as to form specific size of cell, attaching the ribbons in a layered form and heat setting and expanding the attached portion to form a basic honeycomb core, and then impregnating and setting the basic honeycomb core in phenol resin containing graphite powder.

Other objects and advantages will be apparent to those of ordinary skilled in the art from the following description.

DETAILED DESCRIPTION OF THE INVENTION

The present invention relates to a method for producing honeycomb cores having excellent thermal stability, mechanical properties and a rapid setting speed.

The method for producing honeycomb cores is as follows: First, an adhesive is applied onto a ribbon type of carbon fiber fabrics at regular intervals so as to form the specific size of cell. The ribbons are then attached in a layered form, and the attached portions are subjected to heat setting and expanding to form the basic honeycomb core. Then the basic honeycomb core is subjected to impregnation and setting in phenol resin containing 0.5 to 4% by weight of graphite powder having 0.3 to 2 μm of average diameter.

The phenol resin used in the present invention is preferably the novolak type having 50% of fixed carbon ratio, in order to minimize gas due to thermal decomposition occurring in the setting procedure.

In the honeycomb core produced by using carbon fiber as a reinforcing material, when the diameter of graphite added is smaller than that of fiber, cracks occurring in fiber direction due to gas discharge by thermal decomposition of resin attached to graphite powder during heat treatment for setting, carbonization or graphitization can be prevented in advance, and the intrinsic surface properties of the honeycomb core can be exhibited due to the very small particle size. On the contrary, when the diameter of graphite added is relatively large (for, example, if the diameter is equal to or larger than the diameter of carbon fiber of about 7 $\mu$m), reinforcing material may be damaged by the thermal decomposition during setting, before the surface properties between the reinforcing material or binding material and graphite powder is exerted, and thus the increase of mechanical properties cannot be anticipated. In addition, resin attached to graphite powder renders the surface of the honeycomb core non-uniform, which results in poor appearance as well as difficulty in testing the mechanical properties in order to obtain a one dimensional function value. Accordingly, the average diameter of graphite powder is preferably about 0.5 to 2 $\mu$m.

The amount of graphite powder added is 0.5 to 4% by weight based on the amount of resin.

Figure 1:
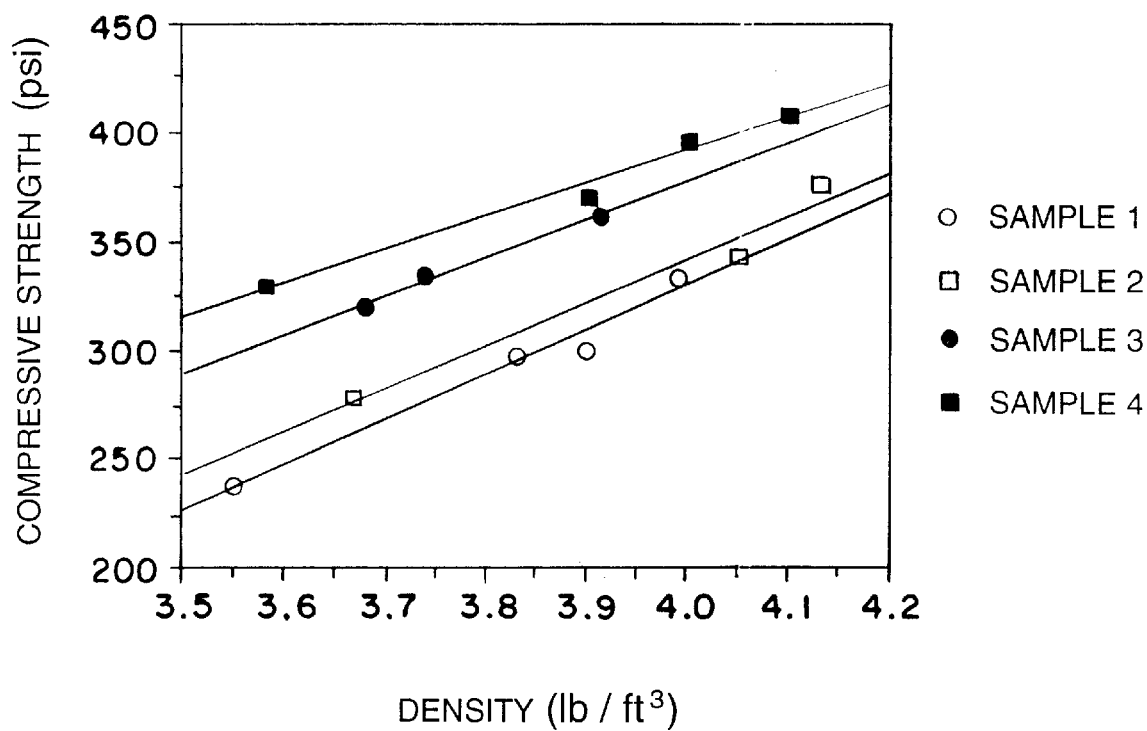
FIG. 1 shows the compressive strength versus the density of a honeycomb core produced by adding graphite powder to two types of phenol resins, novolak and resol resins, respectively, according to the present invention.

As seen in FIG. 1, an addition of graphite powder renders the compressive strength of honeycomb core much improved regardless of the type of phenol resins. This is because graphite powder itself has excellent dispersion force, which is one of the properties capable increasing surface energy between the carbon fiber and phenol resin, and because graphite powder itself is very stable to heat and acts as another binding material interfacing with the rapid thermal decomposition of phenol resin during heat treatment, which results in a reduction of damage to the carbon fiber and thus increases the final physical properties of the honeycomb core. Heat stabilizing action caused by the addition of graphite powder can reduce setting time and thus give considerable economic merit to the total production process.

Now, the present invention will be described more specifically with reference to examples hereafter; however, it should be noted that the present invention is not intended to be restricted to these specific examples.

EXAMPLES

The mechanical properties of a honeycomb core were determined in terms of compressive strength by using Instron model #1125 in accordance with ASTM C365. To improve the reliability of the test result, 5 or more of samples were prepared for each test condition. The size of the compression head was fixed at 3.04 in$^2$. The cross head speed was kept constant at 0.1 mm/minute and the size of samples was 50×50×13 mm$^3$.

Example 1

The honeycomb core was produced by the expansion method using a second dimensional plain weave type polyacrylonitrile carbon fiber (manufactured by Toray Co., Japan; 6000 monofilament, weight: 331 g/m$^2$) having a thickness of 0.38 mm. More particularly, honeycomb cores were produced by applying tetrafunctional epoxy adhesive onto carbon fiber fabrics at regular intervals, so that the resulting honeycomb core had a cell size of 3/8 inch, attaching the fabrics in a layered form, heat setting the attached portion using hot press under suitable pressure and then expanding the pressed materials into the honeycomb core having a cell size of 3/8 inch by using an expander.

The thus obtained basic honeycomb core was subjected to impregnation and setting in a mixture of resol type of liquid phenol resin (sample 1) with the novolak type of phenol resin (sample 2) in a volume ration of 6:4 to give a honeycomb core having the desired core density.

The two types of phenol resins used were manufactured by KOUNAN KASEI. The differences between them reside in that one is solid and the other is liquid, and the ratio of fixed carbon is 43±2% and 59±2%, respectively. In this Example, the novolak type of phenol resin was diluted with methylethyl ketone in the same viscosity as that of the resol type of phenol resin, in order to determine the effect of the ratio of fixed carbon on the final physical properties of honeycomb core.

In the same manner as samples 1 and 2, the initially shaped basic honeycomb core was subjected to impregnation and setting in resol type (sample 3) and novolak type (sample 4) phenol resins containing 1% by weight of graphite powder based on phenol resin to give a desired honeycomb core.

The graphite powder used was synthetic graphite having a diameter of about 1 to 2 $\mu$m manufactured by Aldrich Chemical Co.

The mechanical properties of a honeycomb core produced in the Example were determined in terms of compressive strength as mentioned above.

Referring to FIG. 1, it can be seen that compressive strength increases as density increases throughout all the samples 1 to 4, which is identical with the mechanical properties of most compressive materials. Comparing sample 1 with sample 2 or sample 3 with sample 4, respectively, it is apparent that sample 2 and 4 which use novolak type phenol resin exhibit much better mechanical properties than those of sample 1 and 3 which use resol type of phenol resin, regardless of the addition of graphite powder.

The reason for this difference was that the mechanical properties of honeycomb core could be affected by the release of different reaction gases from novolak and resol types of phenol resin by thermal decomposition.

The characteristic feature of phenol resin used in this Example was that the novolak and resol types had different fixed carbon ratios, as mentioned above. In this example, the maximum setting temperature was 177° C. It was reported that the thermal decomposition of phenol resin occurred abruptly at about 350° C. Therefore, when high temperature setting, carbonization or graphitization (2500° C.) was carried out, so that the honeycomb core produced by using carbon fibers as reinforcing materials could be used for high temperature (about 300° C. or more) or ultrahigh temperature (about 1500° C. or more), it could be clearly seen that the final physical properties of the honeycomb core could be affected by the fixed carbon ratio difference of phenol resins used as binding materials.

Referring to FIG. 1, the effect of the addition of graphite powder on the final mechanical properties was measured when the density of the honeycomb core was 3.75 lb/ft$^3$, and the results were as follows:

Sample 1: 279 psi
Sample 2: 292 psi
Sample 3: 334 psi
Sample 4: 354 psi

When 1% by weight of graphite powder was added to resol type and novolak type of phenol resin, the mechanical properties increased by 21% and 20%, respectively.

Example 2

This Example meant to examine the optimal amount of graphite powder to obtain the desired final mechanical properties of the honeycomb core.

In order to find the optimal amount of graphite powder added, under the same reaction conditions as Example 1, the honeycomb cores were produced by using the novolak type phenol resin, with 0% by weight (sample 5, the same as sample 2 in Example 1), with 0.5% by weight (sample 6), with 1% by weight (sample 7, the same sample 4 in Example 4), with 2% by weight (sample 8), with 3% by weight (sample 9) and with 5% by weight (sample 10) of graphite powder based on the weight of phenol resin.

Figure 2:
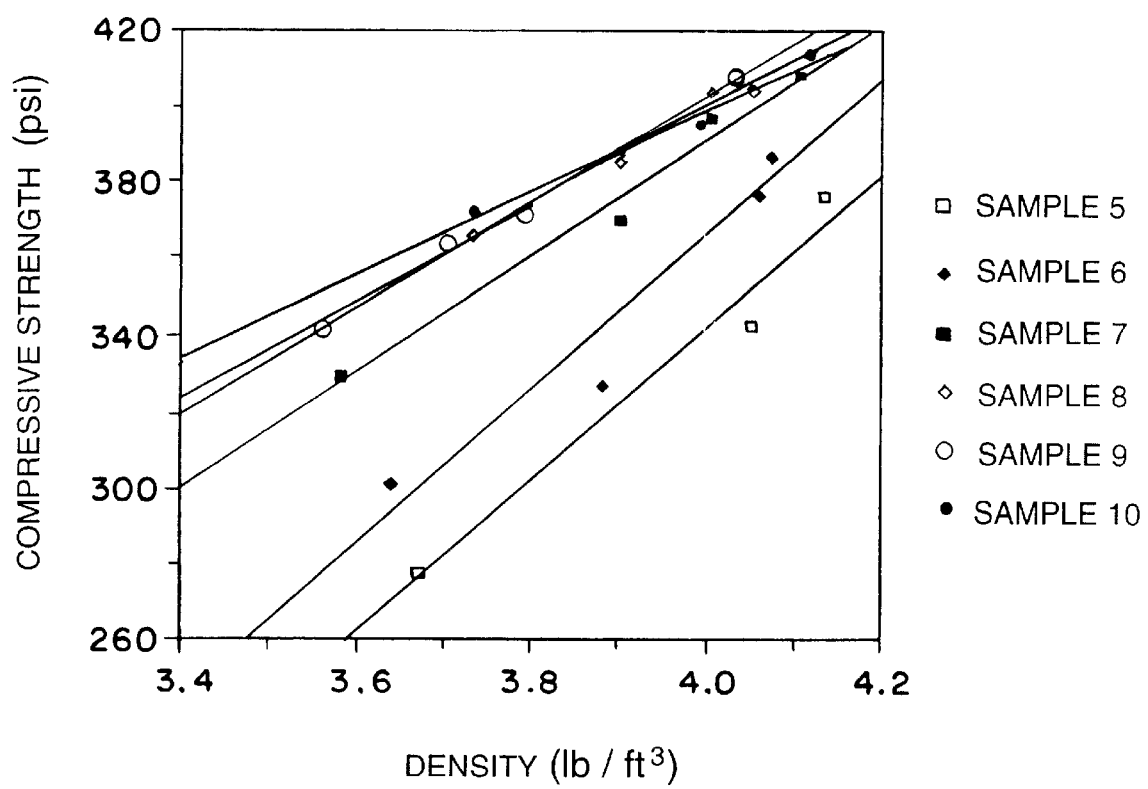
FIG. 2 shows the compressive strength versus the density of a honeycomb core produced by changing the amount of graphite powder added according to the present invention.

As seen from FIG. 2, the more the density of honeycomb core increases, the more the mechanical properties of honeycomb core increase. The mechanical properties of the samples showed a remarkable difference when the amount of graphite powder added was 1% or less. However, when the amount of graphite powder added was 1% or more, the mechanical properties showed no considerable difference.

Figure 3:
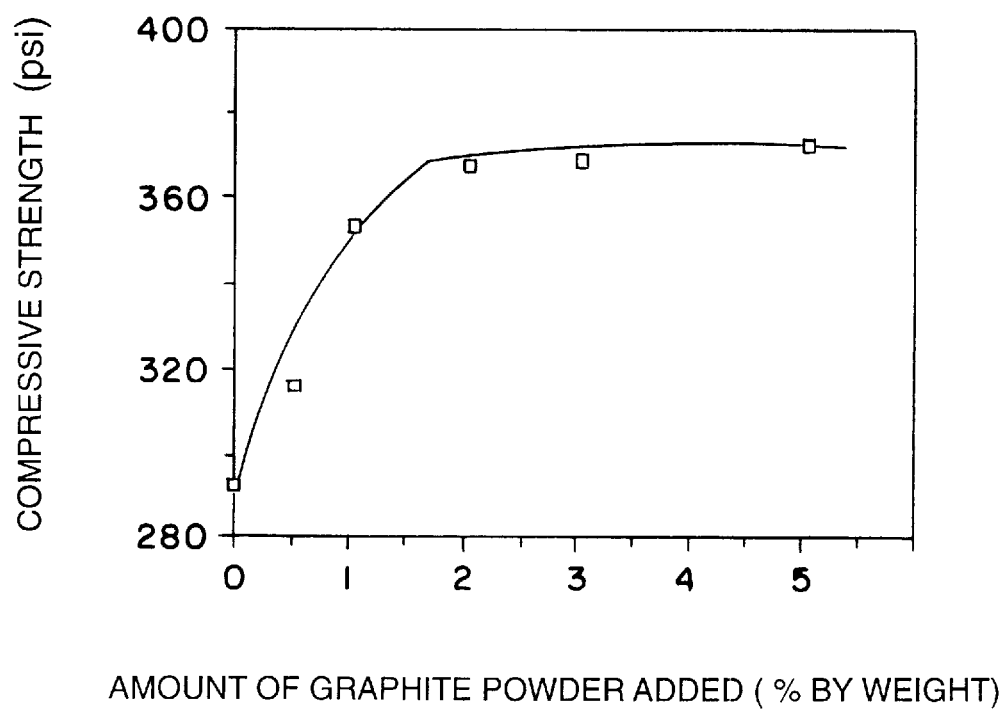
FIG. 3 shows the compressive strength of honeycomb core when the honeycomb core, produced by adding various amounts of graphite powder, has a density of 3.75 lb/ft$^3$.

FIG. 3 shows compressive strength versus the amount of graphite powder added when the density of honeycomb core is 3.75 lb/ft$^3$.

Referring to FIG. 3, the mechanical properties did not show a prominent increase when the amount of graphite powder added was 2% by weight based on the weight of phenol, which confirmed the result shown in FIG. 2. This result indicates that although graphite powder was added to improve the surface properties, due to the dispersing force in a honeycomb core produced by using carbon fiber as a reinforcing material, the potential energy capable of exerting the dispersing force approached a saturation condition when the additional amount of graphite powder was 2% or more.

What is claimed is:

1. A method for producing a honeycomb core having excellent thermal stability, mechanical properties and a rapid setting speed, which comprises applying adhesive onto a ribbon type of carbon fiber fabrics at regular intervals so as to form the specific size of a cell, attaching the ribbons in a layered form and heat setting and expanding the attached portion to form a basic honeycomb core and then impregnating and setting the basic honeycomb core in phenol resin containing 0.5 to 4% by weight of graphite powder having 0.3 to 2 $\mu$m of average diameter.

2. A method for producing a honeycomb core according the claim 1 in which the fixed carbon ratio of the resin used is 50% or more.

3. A method for producing a honeycomb core according to claim 1 in which the resin used is novolak resin.

* * * * *